May 19 1936.  A. LARSEN  2,041,553
SEPARATION OF DUST FROM GASES
Filed March 12, 1935   3 Sheets-Sheet 1
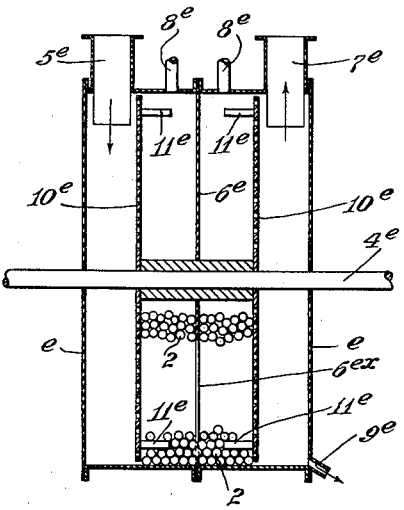
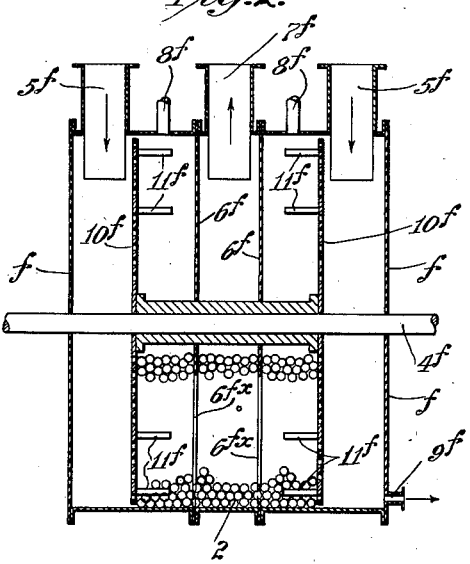
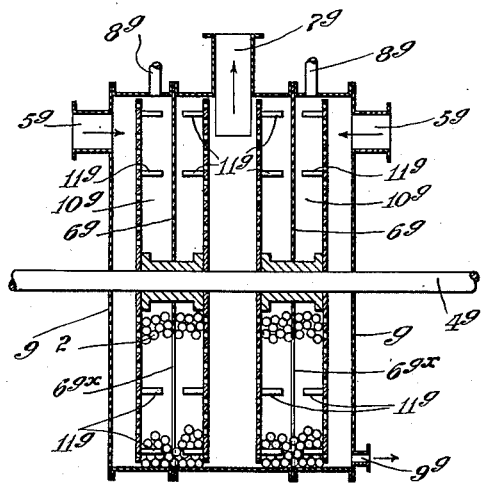
INVENTOR
Axel Larsen
BY
Redding, Greeley & O'Shea
ATTORNEYS May 19, 1936.  A. LARSEN  2,041,553
SEPARATION OF DUST FROM GASES
Filed March 12, 1935  3 Sheets-Sheet 2

INVENTOR
Axel Larsen
BY
Redding, Greeley & O'Shea
ATTORNEYS

Patented May 19, 1936

2,041,553

UNITED STATES PATENT OFFICE 2,041,553

SEPARATION OF DUST FROM GASES

Axel Larsen, Aalborg, Denmark, assignor to F. L. Smidth & Co., New York, N. Y., a corporation of New Jersey Application March 12, 1935, Serial No. 10,595
In Great Britain March 13, 1934

4 Claims. (Cl. 183—9)

This invention relates to the separation of dust from gases and is particularly applicable to the separation of dust from the waste gases from boiler furnaces and kilns, such as rotary kilns used in the manufacture of hydraulic cement. It will be obvious, however, as this description proceeds, that the invention is applicable to the separation of dust from air in mills and other places in which dust develops.

There have been used heretofore in the separation of dust from gases (including, of course, air) not only textile filters and electrical dust separators, but also ball filters sometimes so called in which dust-laden air is caused to pass through a layer of loose bodies, sometimes of different shapes but for convenience referred to as balls, on the surfaces of which, particularly the surfaces which may be described as in the lee of the air stream, the dust is deposited. Such loose bodies or balls are periodically agitated to dislodge the dust and are sometimes taken out to permit the dust to be removed and collected and are then returned to the filter casing. It is well known that such ball filters are usually but partially effective in separating and retaining all of the air carried dust. It has also been proposed to pass the dust-laden air through a chamber in which water is sprayed or falls in drops and serves to wash the dust from the surfaces against which the dust-laden air strikes. This method may have a considerable degree of efficiency in removing the dust from the air, but, as will be understood, the installation and operation involve great expense, not only because of the necessarily large size of the dust separating chamber, but because of the large volume of water to be supplied and handled. Moreover, the dust often adheres to the surfaces exposed and is difficult to remove.

The difficulties above referred to are overcome and high efficiency is attained in the practice of the present invention in accordance with which the dust-laden gas, as it will be called herein, is caused to pass through a layer of loose bodies the surfaces of which are constantly agitated or kept in relative motion with respect to one another so that practically all of the dust is caught by the loose bodies and is constantly being removed therefrom by the conjoint action of the water and the relative motion. It will be obvious that the relative motion of the loose bodies may be accomplished in different ways; thus the container which receives the bodies may take the form of a rotary drum by the rotation of which the bodies are kept in relative motion, or it may take the form of a fixed cylinder or a fixed receptacle of any other suitable shape in which mechanically operated stirrers serve to keep the bodies in a state of relative motion. It will be understood that the capacity of the loose bodies for catching the dust is increased by the fact that their surfaces are moist and also that the constant relative movement of the bodies brings about an action of attrition between the bodies themselves by which the dust which adheres to the bodies is constantly removed from the bodies and passes on with the water which is supplied, the water and the dust forming a slime or what is known in the cement industry as slurry. In fact, in plants in which cement is produced by the wet process in which the cement raw material when ground and mixed with water forms slurry, such slurry may itself be used in the separation of dust from the kiln gases as the liquid with which the loose bodies are moistened.

It will be understood, of course, that any suitable liquid may be used for the moistening of the surfaces of the loose bodies, the choice of one liquid or another being determined by the nature of the material acted upon. It will also be understood that the loose bodies may have different shapes, spherical or otherwise as the convenience of the manufacturer may determine.

The invention will be more fully explained hereinafter with reference to the accompanying drawings in which several embodiments of the invention are illustrated, it being understood that the drawings are diagrammatic in character.

In the drawings:

Figures 1, 2, 3, 4 and 6 are views in diametrical, vertical section showing forms of apparatus adapted for the practice of the invention in which the container is placed within an outer casing, is rotatable and has its side plates perforated to permit the passage of dust laden gas.

In the construction shown in Figure 1 the container is mounted to rotate with the shaft 4 and the plates 10ᵉ which form it are perforated to permit the dust bearing gas to pass into the container at one side and to pass from it at the other side. The container is divided by a partition 6ᵉ formed near the bottom with an opening 6ᵉˣ to permit the gas to pass from one compartment to the other. The container is shown as provided with projections 11ᵉ to assist in the agitation of the loose bodies 2. In this instance also the container is placed within an outer fixed casing e which is provided with an inlet at 5ᵉ for the admission of the dust-laden gas, with an outlet at 7ᵉ for the dust-free gas and with an outlet at 9ᵉ for the thin slurry formed by the dust and the water which may be supplied through a pipe, as at 8ᵉ. The container having been charged with the loose bodies the dust-laden gas, being prevented by the partition 6ᵉ from passing through the upper part of the container, passes through the lower part of the container and the loose bodies therein and having been freed from dust through the coaction of the water and the relatively moving bodies, escapes through the outlet 7ᵉ.

In the construction shown in Figure 2 the plates 10ᶠ, which form the container and rotate with the shaft 4ᶠ, are themselves perforated and are divided by two partitions 6ᶠ to form three compartments and to prevent the gas from passing directly through the upper part of the container from side to side. The container is enclosed within a casing f provided with two inlets 5ᶠ for gas and one common outlet 7ᶠ and with an outlet 9ᶠ for the escape of the thin slurry formed by the conjoint action of the water admitted at 8ᶠ and the relative motion of the loose bodies. It will be understood that the partitions 6ᶠ are provided near the bottom with openings 6ᶠˣ to permit the passage of the gas side to side through the lower part of the container and through the mass of loose bodies therein. Stirring projections 11ᶠ may be provided on the inner faces of the plates 10ᶠ.

In the construction shown in Figure 3 there are two containers 10ᵍ formed by perforated plates as before and each divided in its upper portion by a partition 6ᵍ provided in its lower portion with an opening 6ᵍˣ. The two containers, mounted to rotate with the shaft 4ᵍ, are enclosed within an outer casing g which may be provided at 5ᵍ with inlets for dust-laden gas and at 7ᵍ with an outlet for the dust-free gas. Water may be admitted to both containers 8ᵍ and the slurry formed from the dust by the coaction of the water and the relative movement of the loose bodies may be discharged through an outlet at 9ᵍ.

Figure 4:
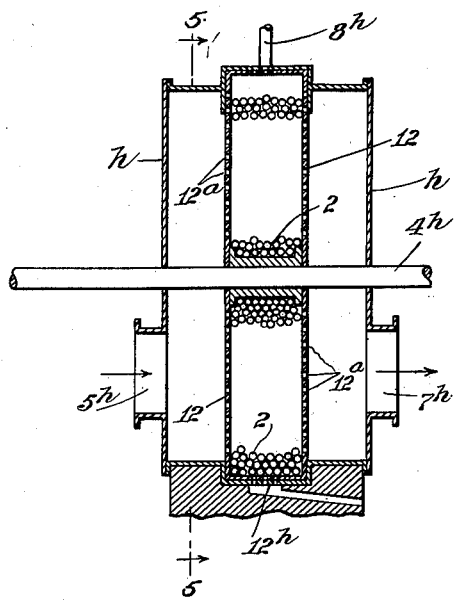
Figure 5:
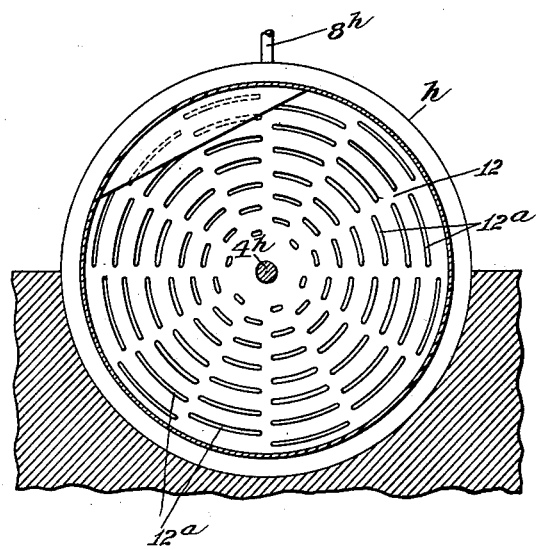
Figure 5 is a view in section on the plane indicated by the broken line 5—5 of Figure 4.

In the construction shown in Figures 4 and 5 a container formed by two plates 12 mounted to rotate with the shaft 4ʰ and formed with arcuate slots 12ᵃ may be supplied with water through a pipe 8ʰ. The casing h which encloses the container may receive dust-laden gas through an inlet 5ʰ and the dust-free gas after it has passed through the container and the mass of loose bodies therein may be discharged through an outlet 7ʰ, while the slurry formed by the admixture of water and dust within the container may be discharged through an outlet at 12ʰ in the periphery of the container and a registering outlet in the casing or its base.

Figure 6:
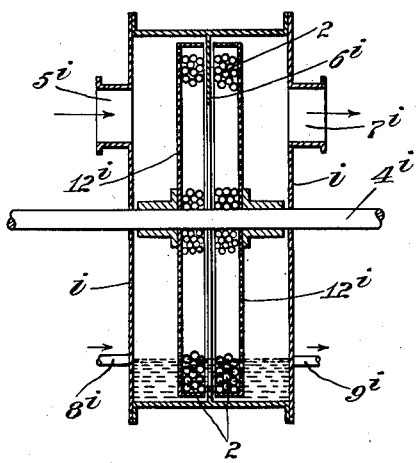

In the construction shown in Figure 6 a single container formed of perforated side plates 12ⁱ is mounted to rotate with the shaft 4ⁱ and is divided by a partial partition 6ⁱ. In this instance the casing i is provided with a gas inlet 5ⁱ and a gas outlet 7ⁱ, with a water inlet 8ⁱ and with a slurry discharge 9ⁱ, the water being allowed to accumulate in the lower part of the casing i so that the loose bodies within the container 12ⁱ are moistened as they pass through the water in the lower part of the casing and by contact with one another as they are stirred in the rotation of the container.

Figure 7:
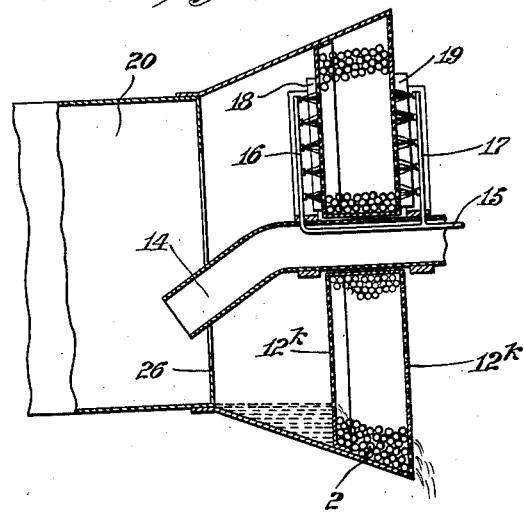
Figure 7 is a view in longitudinal, sectional elevation illustrating the application of the invention to a rotary cement kiln, a portion of which is shown.

In Figure 7 there is illustrated a direct application of the invention to a rotary cement kiln, part of which, at the feeding end, is shown at 20. In this instance the container, to be charged with the loose bodies 2, is formed by perforated plates 12ᵏ secured to the shell of the kiln or an extension thereof at the feeding end. The dust-laden gas obviously must pass through the container from side to side through the mass of loose bodies 2 therein. To provide for the moistening of the bodies and also to facilitate the removal of such moistened dust as may lodge on the outer surface of the plates 12ᵏ a water pipe 15, introduced through the non-rotating feed tube 14, is provided with nozzle bearing branches 16 and 17 by which water is discharged against the outer surface of the plates 12ᵏ. Stationary scrapers 18 and 19 coact with the outer surfaces of the perforated plates 12ᵏ to remove therefrom the moistened dust which is then discharged. The thin slurry removed from the outer surface of the left hand plate 12ᵏ falls into the chamber between that plate and the annular flange 26 and flows slowly from that chamber through perforations in the plate 12ᵏ into the space between the two walls 12ᵏ of the container thereby introducing liquid from this source into the container itself where it moistens the surfaces of the bodies therein. The thin slurry discharged from the space between the walls 12ᵏ may fall into a suitable vessel placed to receive it, together with the thin slurry removed from the outer surface of the corresponding plate 12ᵏ by the scraper 19.

Figure 8:
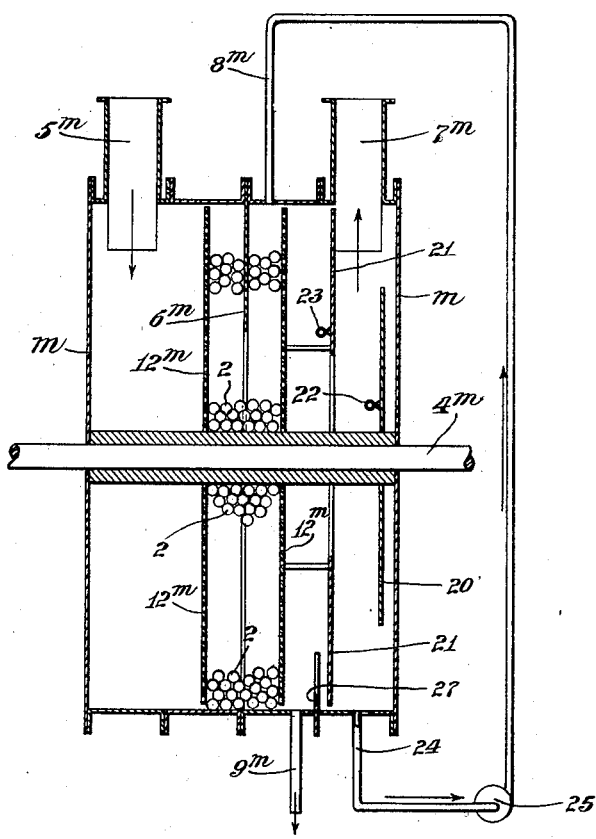
Figure 8 is a view in diametrical, vertical section of a form of apparatus adapted for the practice of the invention and in which the container into which the loose bodies are introduced is rotatable and has its side plates perforated, this figure also illustrating an arrangement for circulation of the water used.

It will be understood that in any case in which, by reason of the nature of the material or otherwise, the gas is not completely freed of dust the action of the dust separator herein described may be supplemented by other means, as illustrated, for example, in Figure 8, in which the container is shown as formed by perforated plates 12ᵐ mounted to rotate with shaft 4ᵐ and as divided as before by a partition 6ᵐ, all enclosed within a fixed casing m; the gas admitted within the casing through an inlet 5ᵐ and escaping therefrom through an outlet 7ᵐ, after passing through the container and the mass of bodies therein, is discharged from the container into an annular chamber formed by an annular plate 21, fixed to the container, a dam 27 being formed at the bottom of the casing to direct the most heavily dust-laden water discharged from the container to an outlet 9ᵐ. A circular plate 20 is also secured to the shaft. The plates 20 and 21 constitute baffles against the proximate faces of which the gas, after the greater portion of the dust has been separated therefrom, impinges on its way toward the outlet 7ᵐ. In operative relation with the plates 20 and 21 are placed spray jets 22 and 23 supplied with water from any suitable source, not necessary to be shown herein. The fine dust particles which strike the wetted surfaces of the plates 20 and 21 are washed therefrom by the water delivered by the spray jets 22 and 23 and the water thus lightly laden with dust falls to the bottom of the casing and escapes therefrom through an outlet 24 to a pump 25 by which it is discharged through the pipe $8^m$ into the container formed by the perforated plates $12^m$. The water supplied through the spray nozzles 22 and 23, being lightly dust-laden, thus replaces in the container the water which passes from the the container to and through the outlet $9^m$.

Various other changes in the arrangements of parts of the apparatus employed may be made to suit different conditions of use and it will be understood that the invention, except as pointed out in the accompanying claims, is not limited to any of the structures shown and described herein.

I claim as my invention:

1. Apparatus for the separation of dust from gas comprising a container mounted to rotate and formed of perforated plates, a mass of loose bodies in the container, means to introduce water into the container, a casing about the container, a partition in the container having an opening, and means to introduce dust-laden gas into the casing at one side of the container and to pass through the perforated plates of the container and through the mass of bodies therein, means to permit the dust-free gas to escape from the casing at the other side of the container, and means to permit the dust-laden water to escape from the casing.

2. The combination with a rotary kiln, of perforated plates secured to the kiln shell and forming a container between them, a mass of loose bodies in the container, means to introduce water into the container, and means to permit the dust-laden water to escape.

3. Apparatus for the separation of dust from gas comprising a container, a mass of loose bodies in the container, a casing enclosing the container, means to introduce water into the container, means to cause dust-laden gas to pass through the mass of bodies in the container, and means in the space between the container and the casing to separate from the gas which has passed through the mass of bodies the fine particles of dust carried by such gas.

4. Apparatus for the separation of dust from gas comprising a container, a mass of loose bodies in the container, a casing enclosing the container, means to cause dust-laden gas to pass through the container and the mass of loose bodies therein, means to introduce water into the container, means to permit heavily dust-laden water to escape from the casing, means to introduce other water into the space between the container and the casing, and means to conduct the last mentioned water from the casing to the container.

AXEL LARSEN.